United States Patent
Yoo et al.

(10) Patent No.: US 6,642,972 B2
(45) Date of Patent: Nov. 4, 2003

(54) ARRAY SUBSTRATE FOR A LIQUID CRYSTAL DISPLAY AND METHOD FOR FABRICATING THEREOF WITH INSULATING STACK MADE FROM TFT LAYERS BETWEEN CROSSED CONDUCTORS

(75) Inventors: Soon-Sung Yoo, Kyoungsangbuk-do (KR); Dong-Yeung Kwak, Taegu (KR); Hu-Sung Kim, Seoul (KR); Yu-Ho Jung, Kyoungsangbuk-do (KR); Yong-Wan Kim, Kyoungsangbuk-do (KR); Duk-Jin Park, Taegu (KR); Woo-Chae Lee, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 78 days.

(21) Appl. No.: 09/892,785

(22) Filed: Jun. 28, 2001

(65) Prior Publication Data

US 2002/0021376 A1 Feb. 21, 2002

(30) Foreign Application Priority Data

Jul. 13, 2000 (KR) ........................................ 2000-40117

(51) Int. Cl.$^7$ ............................................. G02F 1/1333
(52) U.S. Cl. ......................................................... 349/40
(58) Field of Search .............................. 349/40, 192, 54

(56) References Cited

U.S. PATENT DOCUMENTS 5,486,939 A * 1/1996 Fulks ........................... 349/122

* cited by examiner

*Primary Examiner*—James Dudek
*Assistant Examiner*—Timothy Rude
(74) *Attorney, Agent, or Firm*—Morgan Lewis & Bockius LLP

(57) ABSTRACT

An array substrate for use in a liquid crystal display device is fabricated by the steps of forming a first metal layer on a substrate, patterning the first metal layer to form a gate line, a gate electrode, a gate pad, a first shorting bar, and a second shorting bar, forming a gate insulation layer, a pure amorphous silicon layer, a doped amorphous silicon layer and a second metal layer to cover the patterned first metal layer, patterning the second metal layer and the doped amorphous silicon layer to form first, second and third through-holes and first and second grooves to expose a portion of the pure amorphous silicon layer, the first and second grooves creating an isolated portions of the second metal layer, forming a passivation layer to cover the patterned second metal layer, forming a source electrode, a drain electrode, a data line, a data pad, an insulating segment, and first, second and third contact holes, and forming a pixel electrode, a first connector and a second connector of a transparent conductive material.

13 Claims, 9 Drawing Sheets

ARRAY SUBSTRATE FOR A LIQUID CRYSTAL DISPLAY AND METHOD FOR FABRICATING THEREOF WITH INSULATING STACK MADE FROM TFT LAYERS BETWEEN CROSSED CONDUCTORS

This application claims the benefit of Korean Patent Application No. 2000-40117, filed on Jul. 13, 2000 in Korea, which is hereby incorporated by reference.

BACKGROUND OF THE INVENTION

1. Field of the Invention

The present invention relates to a liquid crystal display device, and more particularly, to an array substrate for a liquid crystal display device.

2. Description of Related Art

In general, liquid crystal display (LCD) devices make use of optical anisotropy and polarization properties of liquid crystal molecules to control arrangement orientation. The arrangement direction of the liquid crystal molecules can be controlled by an applied electric field. Accordingly, when an electric field is applied to liquid crystal molecules, the arrangement of the liquid crystal molecules changes. Since refraction of incident light is determined by the arrangement of the liquid crystal molecules, display of image data can be controlled by changing the electric field applied to the liquid crystal molecules.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because of their light, thin, low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs), and pixel electrodes.

As previously described, LCD device operation is based on the principle that the alignment direction of the liquid crystal molecules is dependent upon an electric field applied between the common electrode and the pixel electrode. Moreover, because the liquid crystal molecules have a spontaneous polarization characteristic, the liquid crystal layer is considered an optical anisotropy material. As a result of this spontaneous polarization characteristic, the liquid crystal molecules possess dipole moments when a voltage is applied to the liquid crystal layer between the common electrode and pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

FIG. 1 shows a typical LCD device. The LCD device 11 includes an upper substrate 5 and a lower substrate 22 with a liquid crystal layer 14 interposed therebetween. The upper substrate 5 and the lower substrate 22 are commonly referred to as a color filter substrate and an array substrate, respectively.

In the upper substrate 5 and upon the surface opposing the lower substrate 22, a black matrix 6 and a color filter layer 7 are formed in the shape of an array matrix and includes a plurality of red (R), green (G), and blue (B) color filters so that each color filter is surrounded by corresponding portions of the black matrix 6. Additionally, a common electrode 18 is formed on the upper substrate 5 that covers the color filter layer 7 and the black matrix 6. In the lower substrate 22 and upon the surface opposing the upper substrate 5, a thin film transistor (TFT) "T", is formed in the shape of an array matrix corresponding to the color filter layer 7. A plurality of crossing gate lines 13 and data lines 15 are positioned such that each TFT "T" is located near each crossover point of the gate lines 13 and the data lines 15.

Furthermore, a plurality of pixel electrodes 17 are formed on a pixel region "P" that is defined by the gate lines 13 and the data lines 15 of the lower substrate 22. The pixel electrode 17 includes a transparent conductive material having good transmissivity such as indium-tin-oxide (ITO) or indium-zinc-oxide (IZO), for example.

According to the LCD device 11 of FIG. 1, a scanning signal is applied to a gate electrode of the TFT "T" through the gate line 13, while a data signal is applied to a source electrode of the TFT "T" through the data line 15. As a result, the liquid crystal molecules of the liquid crystal layer 14 are aligned and arranged by operation of the TFT "T", and incident light passing through the liquid crystal layer 14 is controlled to display an image.

FIG. 2 is a plan view showing several pixels of an array substrate fabricated using a four-mask fabrication process for use in a conventional liquid crystal display device. FIG. 3 is an enlarged plan view of a thin film transistor "T" of FIG. 2.

In FIGS. 2 and 3, an array substrate 22 includes a plurality of pixel regions "P" each having a corresponding thin film transistor (TFT) "T", a pixel electrode 17 and a storage capacitor "C". Gate lines 13 are arranged in a transverse direction and data lines 15 are arranged in a longitudinal direction such that each pair of the gate lines 13 and the data lines 15 define a pixel region "P". Each TFT "T" includes a gate electrode 26, a source electrode 28 and an active layer 33. The gate electrode 26 of each TFT "T" extends from the gate line 13, while the source electrode 28 of each TFT "T" extends from the data line 15. Furthermore, gate pads 18 are respectively positioned at ends of each gate line 13, while data pads 19 are respectively arranged at one end of each data line 15.

In general, both data lines 15 and gate lines 13 are classified into even numbered data lines and odd numbered data lines. The gate pads 18 and the data pads 19 are also correspondingly classified into even numbered gate and data pads and odd numbered gate and data pads. Among the gate lines 13 and the data lines 15, the even numbered lines and the odd numbered lines are respectively connected to different shorting bars to prevent discharge of static electricity from occurring in the gate lines 13 and the data lines 15.

In other words, because transparent glass substrates are conventionally used for substrates of LCD devices, any static electricity generated during manufacturing processes will flow into array pattern portions of the array substrate. Accordingly, the TFT, the gate lines and the data lines are all susceptible to significant damage as a result of any discharge of the static electricity. To prevent any damage due to any static electrical discharge, shorting bars are connected with the gate lines and the data lines.

For conventional array substrates fabricated using four-mask processes, one gate shorting bar is usually located at one end of the gate lines 13 and another gate shorting bar is usually located at another end of the gate lines 13. Each gate-shorting bar is connected with either the corresponding even or odd numbered gate line via the even or odd numbered gate pads. However, both gate shorting bars can be located at one end of the gate lines 13 and respectively be connected with either the even or odd numbered gate lines via the even or odd numbered gate pads. Furthermore, in the array substrate fabricated using a four-mask process as shown in FIG. 2, data shorting bars 29 and 32, which are formed in the same plane as the gate lines 13, are arranged at one end of the data lines 15 and respectively connected with either the even or odd numbered data lines via the corresponding even or odd numbered data pads.

In FIG. 2, odd numbered data pads are connected with first data pad connectors 42 ("first connectors 42" hereinafter) through data pad contact holes 39 ("first contact holes 39" hereinafter), and the first connectors 42 are connected with a first data shorting bar 29 through first shorting bar contact holes 40 ("second contact holes 40" hereinafter). Accordingly, the odd numbered data lines are electrically connected with the first data shorting bar 29 via the first connectors 42 and odd numbered data pads. Moreover, the even numbered data pads are connected with second data pad connectors 43 ("second connectors 43" hereinafter) through the first contact holes 39, and the second connectors 43 are connected with a second data shorting bar 32 through second shorting bar contact holes 41 ("third contact holes 41" hereinafter). Accordingly, the even numbered data lines are electrically connected with the second data shorting bar 32 via the second connectors 43 and even numbered data pads.

In FIG. 2, since the second connectors 43 cross the first data shorting bar 29 and contact the second data shorting bar 32 through the third contact holes 41, the second connectors 43 and the first data shorting bar 29 can be short-circuited at intersections "A" of the first data shorting bar 29 and the second connectors 43. As shown in FIG. 4A, a gate insulation layer 31 covers the first data shorting bar 29 and the second data shorting bar 32 in the array substrate that is fabricated using a four-mask fabrication process. However, in the case when defects such as cracks or pin-holes occur in the intersectional portions "A" of the gate insulation layer (see FIG. 4D), the second connectors 43 and the first data shorting bar 29 short-circuit and make electrical connection.

FIGS. 4A to 4D are cross-sectional views taken along line IV—IV of FIG. 2 and show conventional fabricating processes of an array substrate. FIGS. 5A to 5D are cross-sectional views taken along line V—V of FIG. 3 and show fabricating processes of a TFT "T" of FIG. 2.

Thin film transistors (TFTs) can be divided into two generally different categories based upon the relative disposition of their gate electrodes—staggered types and coplanar types. The staggered type TFT includes an inverted staggered type which are generally used for LCD devices due to their simple structure and superior efficiency. Within the inverted staggered type TFT there includes a back channel etched type (EB) and an etch stopper type (ES). A manufacturing method of the back channel etched type TFT will be explained hereinafter.

Referring to FIGS. 4A and 5A, a substrate 22 is first cleaned of organic materials and alien substances to promote adhesion with a first metal layer that is subsequently deposited on the substrate 22 by a sputtering process. Then, the first metal layer is patterned using a first mask to form the gate lines 13 (see FIGS. 2 and 3) in a transverse direction, a gate electrode 26 that extends from each gate line, the gate pads 18 (see FIG. 2) that are disposed at opposite ends of the gate lines, first and second gate shorting bars (not shown) that are perpendicular to the gate lines and respectively contact odd numbered gate pads and even numbered gate pads, and first and second data shorting bars 29 and 32 that are formed parallel with the gate lines and spaced apart from each other.

Referring to FIGS. 4A and 5A, aluminum is conventionally used as a metal for the first metal layer because of its low resistance and reduced RC delay. However, pure aluminum is chemically weak when exposed to acidic processing and may result in formation of hillocks during high temperature processing. Accordingly, aluminum alloys and multi-layered aluminum structures are used for the first metal layer.

Still referring to FIGS. 4A and 5A, the gate insulation layer 31 is formed on an entire surface of the substrate 22 and covers the patterned first metal layer. Then, a pure amorphous silicon (a-Si:H) layer 33 (often referred to as an active layer) and a doped amorphous silicon (n$^+$ a-Si:H) layer 35 (often referred to as an ohmic contact layer) are formed in series upon the gate insulation layer 31. Moreover, a second metal layer 28 is formed upon the doped amorphous silicon (n$^+$ a-Si:H) layer 35 by depositing molybdenum (Mo). The doped amorphous silicon (n$^+$ a-Si:H) layer 35 reduces the contact resistance between the pure amorphous silicon (a-Si:H) layer 33 and the second metal layer 28.

Now, referring to FIGS. 4B and 5B, the second metal layer 28 is patterned using a second mask to form a first hole 45 disposed over the gate electrode 26. By forming the first hole 45, the patterned second metal 28 disposed over the gate electrode 26 is divided into two regions that will become source electrode 30 and drain electrode 31 (in FIG. 5C) in a later step. The two portions of the patterned second metal 28 arranged at left and right sides of the first hole 45, as shown in FIG. 5B, overlap opposite ends of the gate electrode 26. Moreover, when forming the first hole 45, a second hole (not shown) is formed over the first data shorting bar 29 and a third hole 46 is formed over the second data shorting bar 32 by patterning portions of the second metal layer 28. The second hole (not show) and the third hole 46 in the second metal layer 28 respectively become a second contact hole 40 (in FIG. 2) and a third contact hole 41 (in FIG. 4C) in a later step.

Thereafter, a portion of the ohmic contact layer 35 disposed upon the active layer 33 is etched using the patterned second metal layer 28 as a mask, thereby forming a channel region "CH" below the first hole 45 in the active layer 33. Subsequently, a passivation layer 37 is formed over the remaining portions of the patterned second metal layer 28.

Now, referring to FIGS. 4C and 5C, the passivation layer 37, the second metal layer 28, the ohmic contact layer 35 and the active layer 33 are simultaneously patterned using a third mask to form the data line 15, the data pad 19, the source electrode 30 and the drain electrode 31. Accordingly, each pair of gate lines and data lines define a pixel region "P" (in FIG. 2), and the gate insulation layer 31 remains in the pixel region. Furthermore, in the third mask process, a first contact hole 39 is formed extending through the data pad 19. Additionally, a second contact hole 40 (in FIG. 2) disposed over the first data shorting bar 29 and a third contact hole 41 disposed over the second data shorting bar 32 are formed respectively due to formation of the second hole (not show) and a third hole 46 (in FIG. 4B).

Referring to FIG. 5C, a side portion of the drain electrode 31 is exposed during the above-mentioned patterning process. Further, although not depicted in the drawings, gate pad contact holes are formed disposed over the gate pads 18 (in FIG. 2) by patterning stacked layers over the gate pads.

In the above-mentioned patterning process, a dry etching process method is used. After the third mask process, the source electrode 30, the drain electrode 31, the data line 15, and the data pad 19 are formed into desired shapes. However, during this patterning process, defects including pinholes and/or cracks can be created in the gate insulation layer. When these defects are created over the first data shorting bar 29, an electrical short can occur between the first data shorting bar 29 and a subsequently formed connector.

Now, referring to FIGS. 4D and 5D, a transparent conductive material is deposited and patterned to form pixel electrode 17, first connector 42 (in FIG. 2) and second connector 43. Accordingly, the pixel electrode 17 contacts the exposed side portion of the drain electrode 31 and is positioned in the pixel region "P" (in FIG. 2). Moreover, the second connector 43 that crosses the first data shorting bar 29 connects the data pad 19 to the second data shorting bar 32 via the first contact hole 39 and the third contacts hole 41. As a result, the even numbered data line 15 is electrically connected with the second data shorting bar 32. Further, as shown in FIG. 2, the first connector 42 electrically connects the odd numbered data lines to the first data shorting bar 29 via the first contact hole 39 and the second contact hole 40.

In the aforementioned structure, when the defects "D" such as pin holes and/or cracks exists in a portion "A" over the first data shorting bar 29, the first data shorting bar 29 and the second connector 43 are electrically short-circuited in the portion "A". This electrical short prevents accurate results in short/open-circuit testing using the shorting bars. As a result, manufacturing defects can occur in the array substrate, thereby decreasing manufacturing yields of the LCD device.

SUMMARY OF THE INVENTION

Accordingly, the present invention is directed to an array substrate for a liquid crystal display and method for fabricating thereof that substantially obviates one or more of problems due to limitations and disadvantages of the related art.

An object of the present invention is to provide an array substrate for a liquid crystal display device having improved resistance to electrical short-circuiting.

Another object of the present invention is to provide a method of fabricating an array substrate for a liquid crystal display device with decreased defects to increase manufacturing yields.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a plurality of thin film transistors formed on the substrate, each thin film transistor comprises a gate electrode, a source electrode and a drain electrode, a plurality of gate lines arranged in one direction on the substrate, each gate line connected with the gate electrodes of the plurality of thin film transistors and each gate line has a gate pad disposed at a first end thereof, a plurality of data lines arranged perpendicular to the plurality of gate lines on the substrate, each data line connected to the source electrodes of the plurality of thin film transistors and each data line has a data pad disposed at a first end thereof, a plurality of pixel electrodes located at pixel regions defined by intersections of the plurality of gate lines and the plurality of data lines, each pixel electrode contacting each drain electrode of the plurality of thin film transistors, a first data shorting bar arranged parallel with the plurality of gate lines at the first end of the data lines, a second data shorting bar arranged parallel with the plurality of gate lines at the first end of the gate lines and spaced apart from the first data shorting bar, a plurality of first connectors electrically connecting the odd numbered data lines to the first data shorting bar, a plurality of second connectors electrically connecting the even numbered data lines to the second data shorting bar, and a plurality of patterned insulating segments formed over the first shorting bar and below the plurality of second connectors, wherein each patterned insulating segment is disposed at an intersection between the first data shorting bar and each second connector.

In another aspect, a method of fabricating a liquid crystal display device includes the steps of forming a first metal layer on a substrate, patterning the first metal layer to form a gate line, a gate electrode, a gate pad, a first shorting bar, and a second shorting bar, forming a gate insulation layer, a pure amorphous silicon layer, a doped amorphous silicon layer and a second metal layer to cover the patterned first metal layer, patterning the second metal layer and the doped amorphous silicon layer to form first, second and third through-holes and first and second grooves to expose a portion of the pure amorphous silicon layer, the first and second grooves creating an isolated portions of the second metal layer, forming a passivation layer to cover the patterned second metal layer, forming a source electrode, a drain electrode, a data line, a data pad, an insulating segment, and first, second and third contact holes, and forming a pixel electrode, a first connector and a second connector of a transparent conductive material.

In another aspect, an array substrate having thin film transistors, pixel electrodes, gate lines and data lines, wherein each thin film transistor is formed at a crossover point of each pairs of gate lines and data lines, and wherein each pixel electrode is formed in a pixel region defined by each of the pairs of gate lines and data lines, includes a plurality of data pads formed at a first end of the data lines and connected thereto, the data pads including odd numbered data pads and even numbered data pads, each data pad having a first contact hole, a first shorting bar formed adjacent to the data pads and arranged perpendicular to the data lines, a second shorting bar spaced apart from and arranged parallel with the first shorting bar, a gate insulation layer covering the gate lines, the first shorting bar, and the second shorting bar, the gate insulation layer having second and third contact holes, wherein the second contact holes are formed over the first shoring bar, and wherein the third contact holes are formed over the second shorting bar, a first connector connecting the odd numbered data pads to the first shorting bar through the first and second contact holes, a plurality of second connectors each crossing the first shorting bar and connecting the even numbered data pads to the second shorting bar through the first and third contact holes, and a plurality of island-shaped insulating segments formed between the first shorting bar and each second connector at each intersection of the first shorting bar and the second connector, each insulating segment electrically insulating the first shorting bar from each second connector.

In another aspect, a liquid crystal display device includes a substrate, a plurality of gate lines on the substrate, a plurality of data lines on the substrate and disposed perpendicular to the plurality of gate lines, a first data shorting bar arranged parallel with the plurality of gate lines at a first end of the data lines, a second data shorting bar arranged parallel with the plurality of gate lines at a first end of the gate lines and spaced apart from the first data shorting bar, a plurality of first connectors electrically connecting odd numbered data lines to the first data-shorting bar, a plurality of second connectors electrically connecting even numbered data lines to the second data shorting bar, and a plurality of patterned insulating segments formed over the first shorting bar and below the plurality of second connectors, wherein each patterned insulating segment is disposed at an intersection between the first data shorting bar and each second connector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATED EMBODIMENTS

Reference will now be made in detail to illustrated embodiment of the present invention, examples of which are shown in the accompanying drawings. Wherever possible, the same reference numbers will be used throughout the drawings to refer to the same or like parts.

Figure 1:
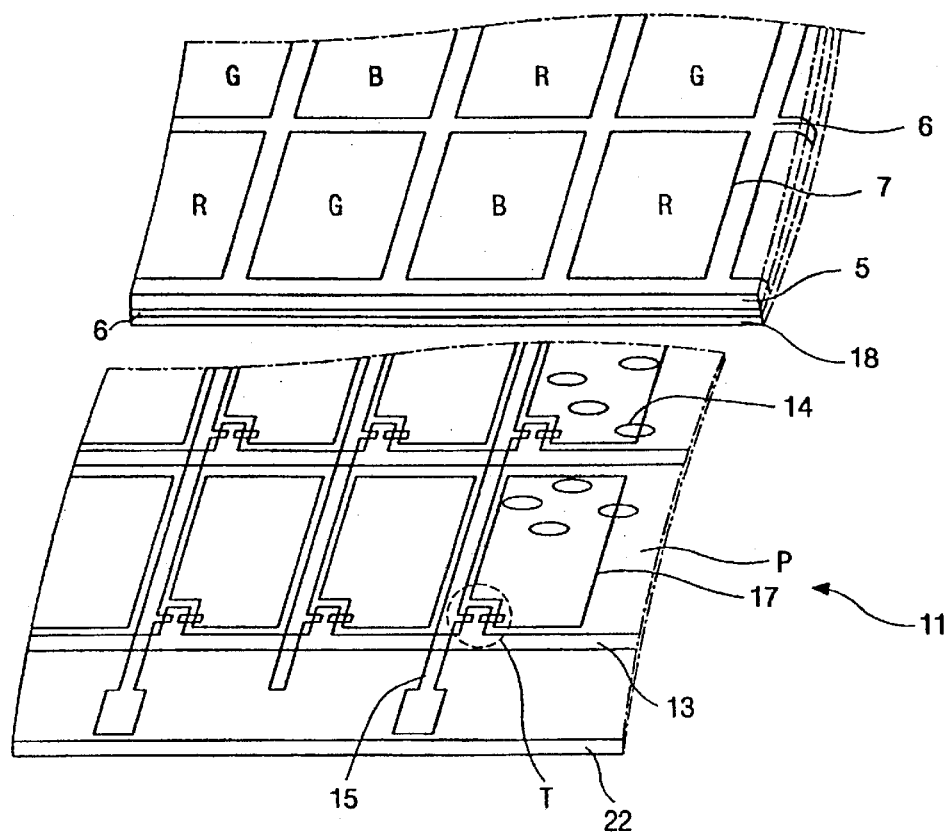
FIG. 1 is the configuration of a typical LCD device.
Figure 2:
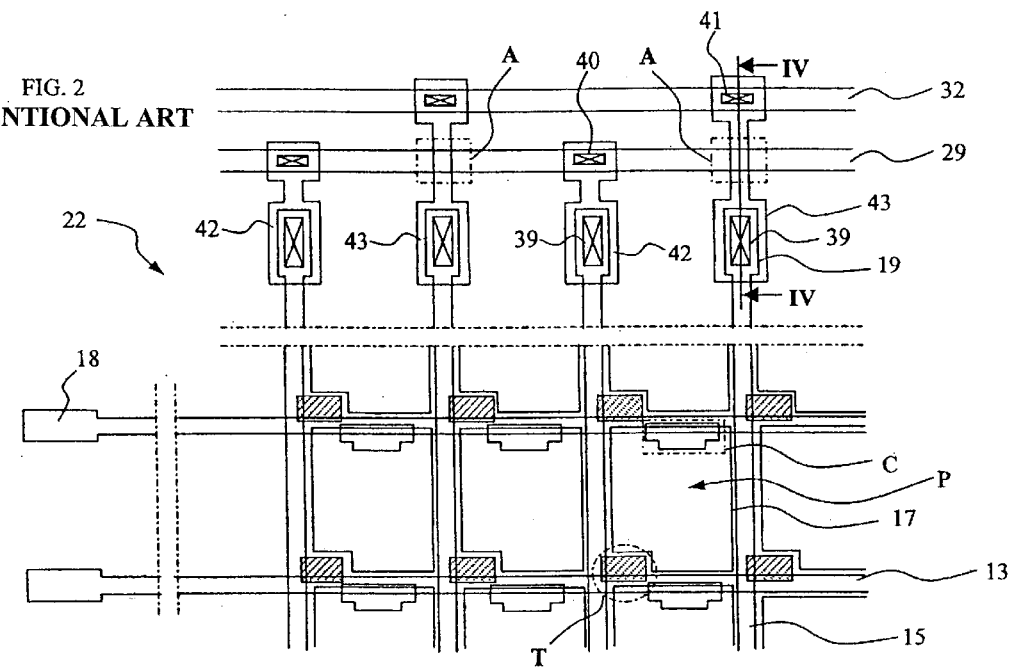
FIG. 2 is a plan view illustrating several pixels of an array substrate fabricated using a four-mask process for use in a liquid crystal display device according to the conventional art.
Figure 3:
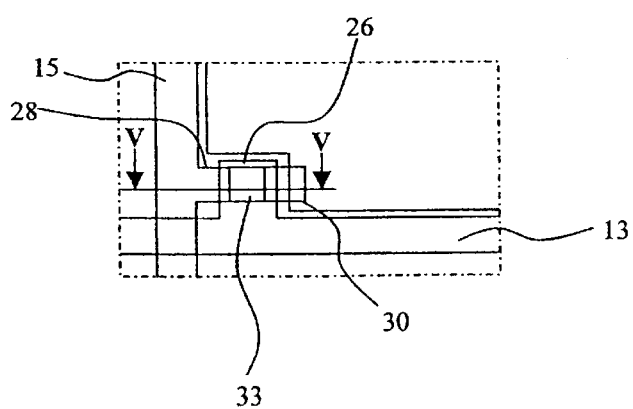
FIG. 3 is an enlarged plan view of a thin film transistor (TFT) "T" of FIG. 2.
Figure 4A:
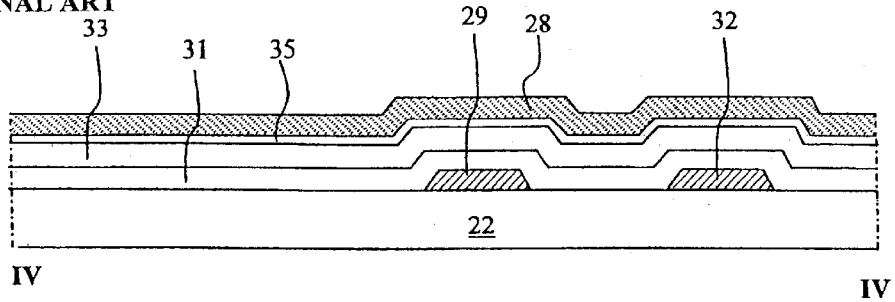
FIGS. 4A to 4D, which are cross-sectional views taken along the line IV—IV of FIG. 2, illustrate fabricating processes of an array substrate according to the conventional art.
Figure 4B:
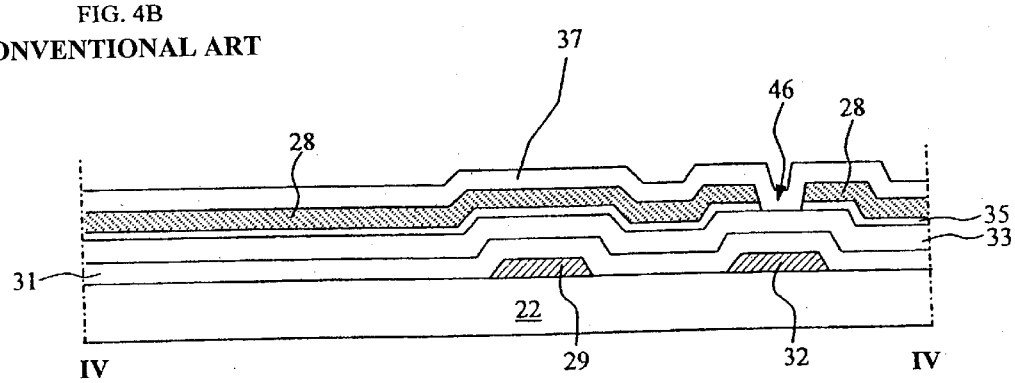
Figure 4C:
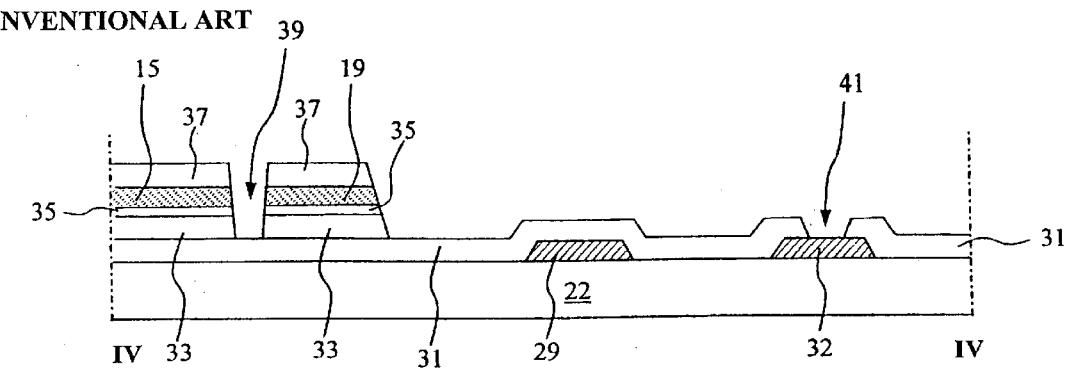
Figure 4D:
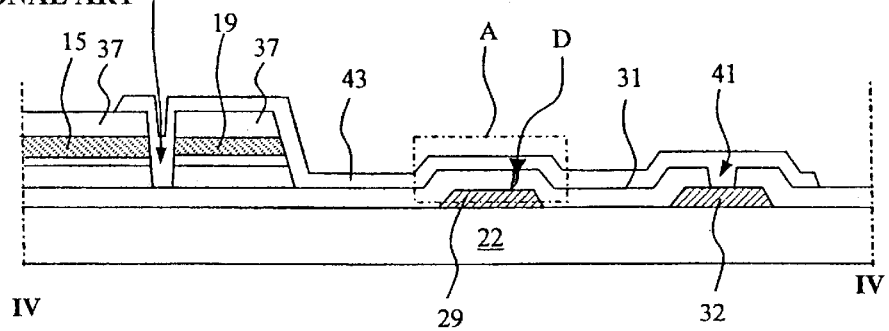
Figure 5A:
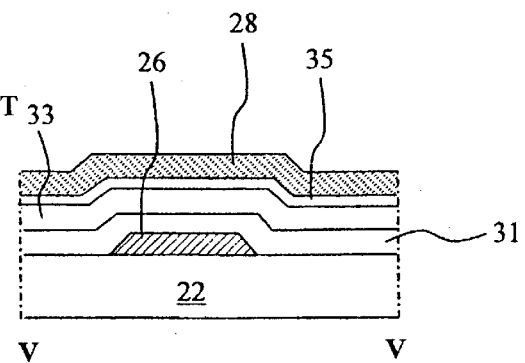
FIGS. 5A to 5D, which are cross-sectional views taken along the line V—V of FIG. 3, illustrate fabricating processes of a TFT "T" of FIG. 2.
Figure 5B:
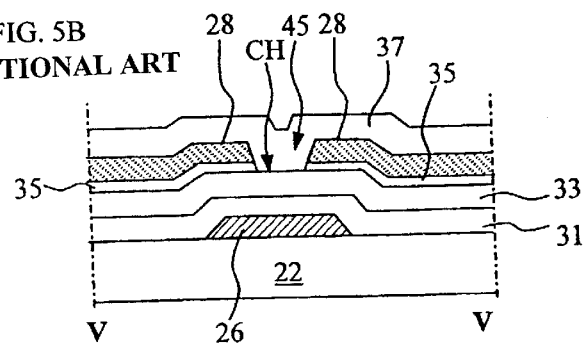
Figure 5C:
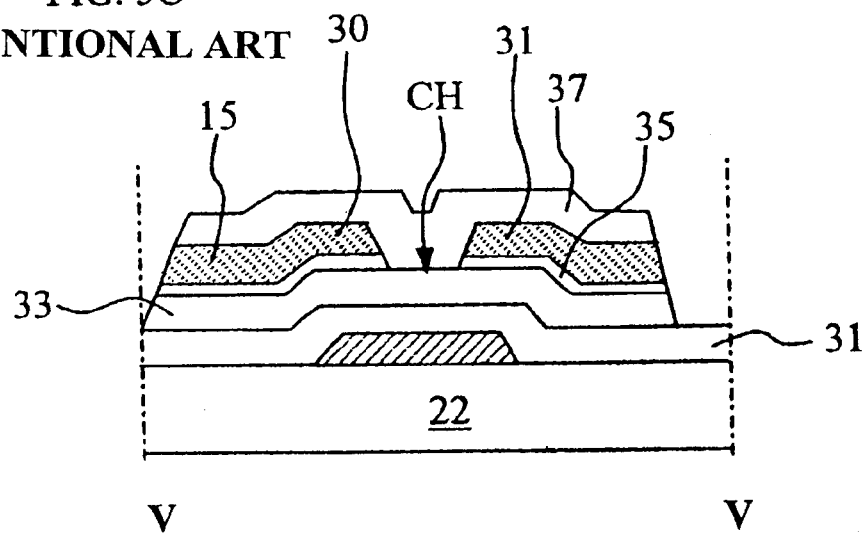
Figure 5D:
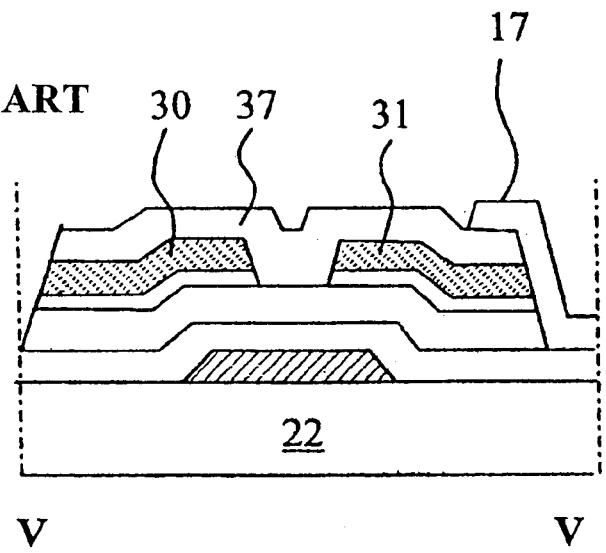
Figure 6:
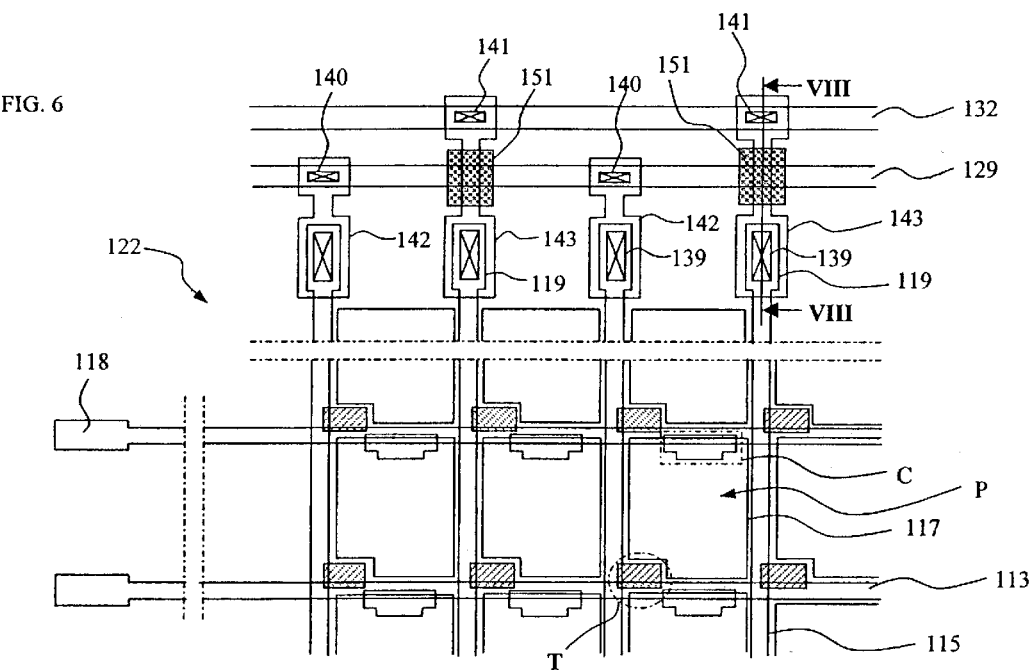
FIG. 6 is a plan view illustrating several pixels of an array substrate fabricated using a four-mask process for use in a liquid crystal display device according to the present invention.
Figure 7:
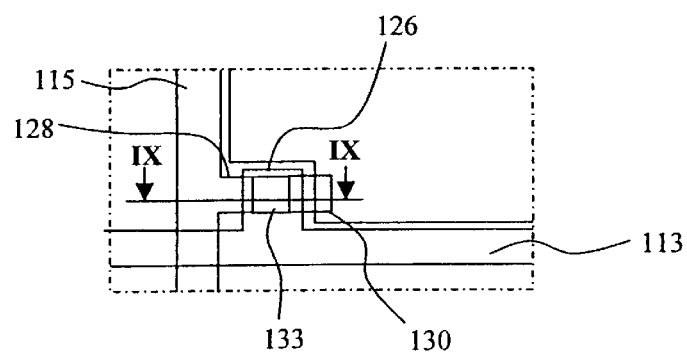
FIG. 7 is an enlarged plan view of a thin film transistor (TFT) "T" of FIG. 6.

FIG. 6 is a plan view showing several pixels of an array substrate for use in a liquid crystal display device fabricated using a four-mask process according to the present invention. FIG. 7 is an enlarged plan view of a thin film transistor "T" of FIG. 6.

As shown in FIGS. 6 and 7, an array substrate 122 includes a plurality of pixel regions "P" each having a thin film transistor (TFT) "T", a pixel electrode 117 and a storage capacitor "C". Gate lines 113 are arranged in a transverse direction and data lines 115 are arranged in a longitudinal direction such that pairs of the gate lines 113 and the data lines 115 define pixel regions "P". As shown in FIG. 6, each storage capacitor "C" comprises corresponding portions of each gate line 113 and each pixel electrode 117. Additionally, as shown in FIG. 7, each TFT "T" comprises a gate electrode 126, a source electrode 128 and an active layer 133, wherein the gate electrode 126 extends from the gate line 113 and the data electrode 128 extends from the data line 115.

Further, in FIGS. 6 and 7, gate pads 118 are respectively arranged at both ends of each gate line 113, while data pads 119 are respectively arranged at one end of each data line 115. In general, the data lines 115 are classified into even numbered data lines and odd numbered data lines, and the gate lines 113 are classified into even numbered gate lines and odd numbered gate lines. Accordingly, the gate pads 118 and the data pads 119 are also classified into even numbered gate and data pads and odd numbered gate and data pads. Among the gate lines 113 and the data lines 115, the even numbered lines and the odd numbered lines are respectively connected to different shorting bars in order to prevent the discharge of static electricity from occurring in the gate lines 113 and the data lines 115. As previously described, because transparent glass substrates are conventionally used for substrates of LCD devices, any static electricity generated during manufacturing processes will flow into array pattern portions of the array substrate. Accordingly, the TFT, the gate lines and the data lines are all susceptible to significant damage as a result of any discharge of the static electricity. To prevent any damage due to any static electrical discharge, shorting bars are connected with the gate lines and the data lines.

For the array substrate fabricated using a four-mask process, although not shown in FIG. 6, one gate shorting bar is located at first ends of the gate lines 113 and another gate shorting bar is located at second ends of the gate lines 113. Each gate-shorting bar is connected with either one of the even or odd numbered gate lines via the corresponding even or odd numbered gate pads. However, both gate shorting bars can be located at one end of the gate lines 113 and be respectively connected with either one of the even or odd numbered gate lines via the corresponding even or odd numbered gate pads.

Furthermore, in the array substrate fabricated using the four-mask process as shown in FIG. 6, data shorting bars 129 and 132, which are formed in a same plane as the gate lines 113, are arranged at one end of the data lines 115 and parallel with the gate lines 113 and are each respectively connected with either one of the even or odd numbered data lines via the corresponding even or odd numbered data pads.

In FIG. 6, the odd numbered data pads are connected with first data pad connectors 142 ("first connectors" hereinafter) through data pad contact holes 139 ("first contact holes"

hereinafter) and the first connectors 142 are connected with a first data shorting bar 129 through first shorting bar contact holes 140 ("second contact holes" hereinafter). Accordingly, the odd numbered data lines are electrically connected with the first data shorting bar 129 via the first connectors 142 and odd numbered data pads. Likewise, the even numbered data pads are connected with second data pad connectors 143 ("second connectors" hereinafter) through the first contact holes 139 and the second connectors 143 are connected with a second data shorting bar 132 through second shorting bar contact holes 141 ("third contact holes" hereinafter). Accordingly, the even numbered data lines are electrically connected with the second data shorting bar 132 via the second connectors 143 and even numbered data pads. The first and second connectors 142 and 143 are formed of at least a transparent conductive material.

In FIG. 6, the second connectors 143 cross the first data shorting bar 129 and contact the second data shorting bar 132 through the third contact holes 141, much like the conventional art. However, in the array substrate of the present invention, an insulating segment 151 (or stacks) comprising individually stacked layers is formed at intersections of the first data shorting bar 129 and the second connectors 143. In contrast to conventional devices, any defects such as cracks and/or pin-holes which may develop in the gate insulation layer (not shown) disposed over the intersection are prevented, and the second connectors 143 and the first data shorting bar 129 are electrically isolated.

FIGS. 8A to 8D are cross-sectional views taken along the line VIII—VIII of FIG. 6 and show fabrication processes of an array substrate according to the present invention.

FIGS. 9A to 9D are cross-sectional views taken along the line IX—IX of FIG. 7 and show fabrication processes of the thin film transistor (TFT) "T" of FIG. 6. According to the present invention, the manufacturing method of the back channel etched type TFT will be explained hereinafter.

Figure 8A:
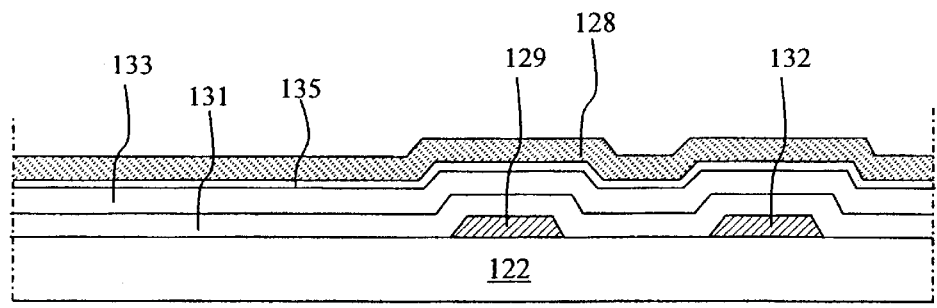
FIGS. 8A to 8D, which are cross-sectional views taken along the line VIII—VIII of FIG. 6, illustrate fabricating processes of an array substrate according to the present invention.
Figure 9A:
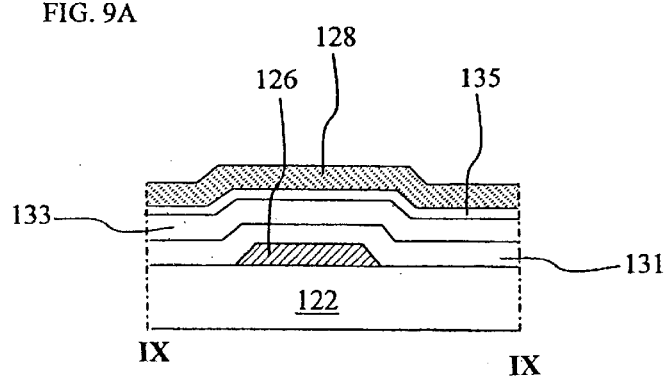
FIGS. 9A to 9D, which are cross-sectional views taken along the line IX—IX of FIG. 7, illustrate fabricating processes of a TFT "T" of FIG. 6.

First, referring to FIGS. 8A and 9A, a first metal layer selected from at least a material of the group consisting of aluminum (Al), aluminum niobium (AlNb), chromium (Cr), molybdenum (Mo), tungsten (W) and alloys thereof, is deposited on a substrate 122 by a sputtering process. However, prior to formation of the first metal layer, a cleaning process is performed which will enhance an adhesion between the substrate 122 and the metal layer and will remove any organic materials and/or alien substances. Thereafter, the first metal layer is patterned using a first mask to form the gate lines 113 (see FIGS. 6 and 7) in a transverse direction, a gate electrode 126 that extends from each of the gate lines 113, the gate pads 118 (see FIG. 6) disposed at opposite ends of each of the gate lines 113, first and second gate shorting bars (not shown) that are perpendicular to the gate lines 113 and respectively contact odd numbered gate pads and even numbered gate pads, and first and second data shorting bars 129 and 132 that are parallel with the gate lines 113 and are spaced apart form each other.

In FIGS. 8A and 9A, the gate insulation layer 131 is formed upon an entire surface of the substrate 122 while covering the patterned first metal layer. Then, a pure amorphous silicon (a-Si:H) layer 133 (active layer) and a doped amorphous silicon (n⁺ a-Si:H) layer 135 (ohmic contact layer) are sequentially formed upon the gate insulation layer 131. Moreover, a second metal layer 128 is formed upon the doped amorphous silicon (n⁺ a-Si:H) layer 135 by depositing molybdenum (Mo) that is subsequently etched by a dry etching process. The doped amorphous silicon (n⁺ a-Si:H) layer (the ohmic contact layer) 135 reduces the contact resistance between the pure amorphous silicon (a-Si:H) layer 133 (the active layer) and the second metal layer 128.

Figure 8B:
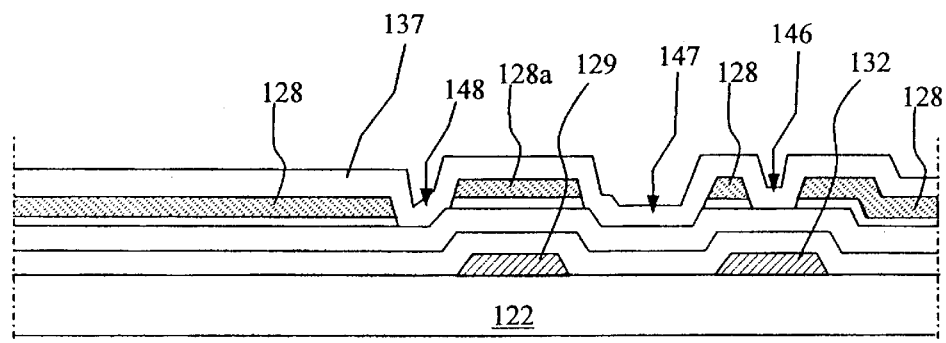
Figure 8C:
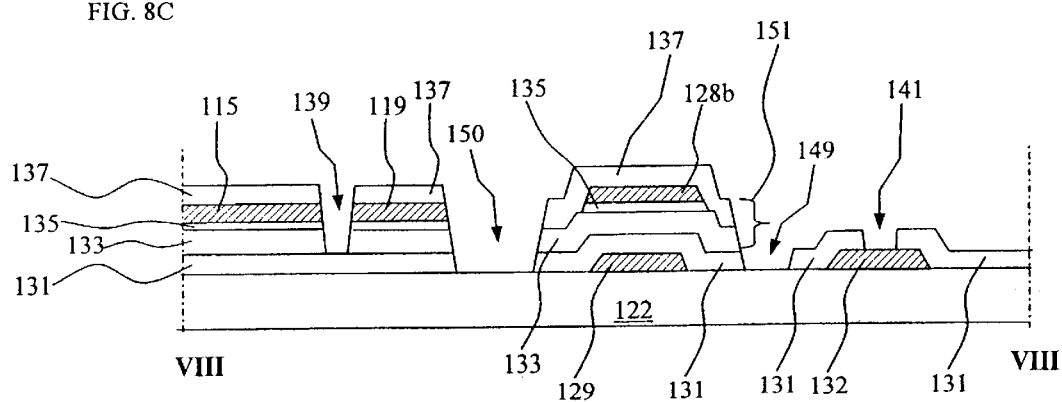
Figure 9B:
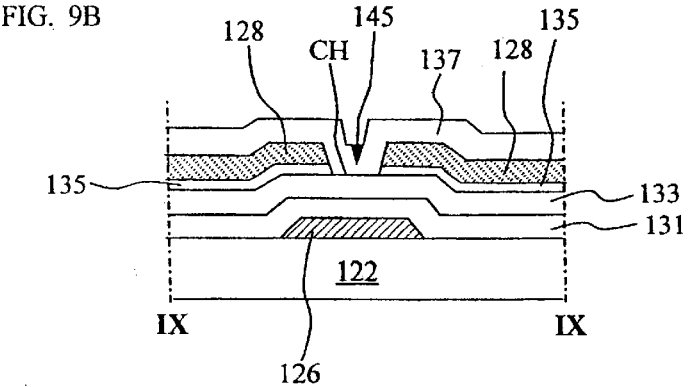

Now, referring to FIGS. 8B and 9B, the second metal layer 128 is patterned using a second mask to form a first hole 145 disposed over the gate electrode 126. As a result of forming the first hole 145, the second metal layer 128 disposed over the gate electrode 126 is divided into two separate regions that will become source electrode 130 and drain electrode 131 (in FIG. 9C) in a later step. The two separate portions of the second metal layer 128 are arranged at opposing sides of the first hole 145, as shown in FIG. 9B, and each overlap opposite ends of the gate electrode 126. Moreover, when forming the first hole 145, a second hole (not shown) is formed disposed over the first data shorting bar 129, and a third hole 146 is formed disposed over the second data shorting bar 132 by patterning corresponding portions of the second metal layer 128. The second hole (not show) and the third hole 146 in the second metal layer 128 become a second contact hole 140 (in FIG. 6) and a third contact hole 141 (in FIG. 8C), respectively.

In FIGS. 8B and 9B, a first groove 147 is formed within a portion of the second metal layer 128 disposed between the first data shorting bar 129 and the second data shorting bar 132. The first groove 147 elongates along a direction of the first shorting bar 129 and the second shorting bar 132 and will subsequently become a first furrow 149 (in FIG. 8C). Furthermore, a second grove 148 is formed within the second metal layer 128 to form an isolated metal layer 128a disposed over the first data shorting bar 129. Accordingly, as a result of forming the second groove 148, the rod-shaped isolated metal layer 128a, which will having a second hole (not show), is formed disposed over the first shorting bar and along the first groove 147. The second groove 148 subsequently becomes a second furrow 150 (in FIG. 8C) and the isolated metal layer 128a also becomes a part of an insulating segment 151 (in FIG. 8C) in a later step.

Thereafter, the portion of the ohmic contact layer 135 disposed on the active layer 133 is subsequently etched using the patterned second metal layer 128 as a mask, thereby forming a channel region "CH" (in FIG. 9B) in the active layer 133 that is positioned below the first hole 145. Then, a passivation layer 137 is formed over portions of the patterned second metal layer 128. The passivation layer 137 includes at least an inorganic material such as silicon nitride (SiNx) or silicon oxide (SiOx), or an organic material such as BCB (Benzocyclobutene) or an acryl-based resin.

Figure 8D:
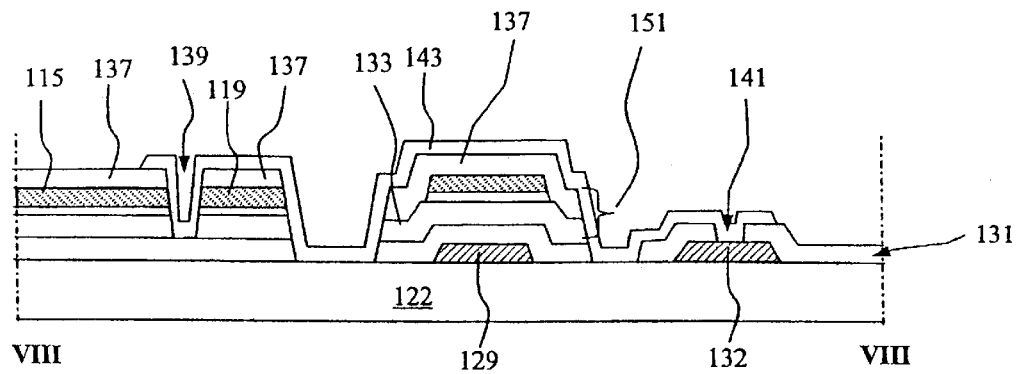
Figure 9C:
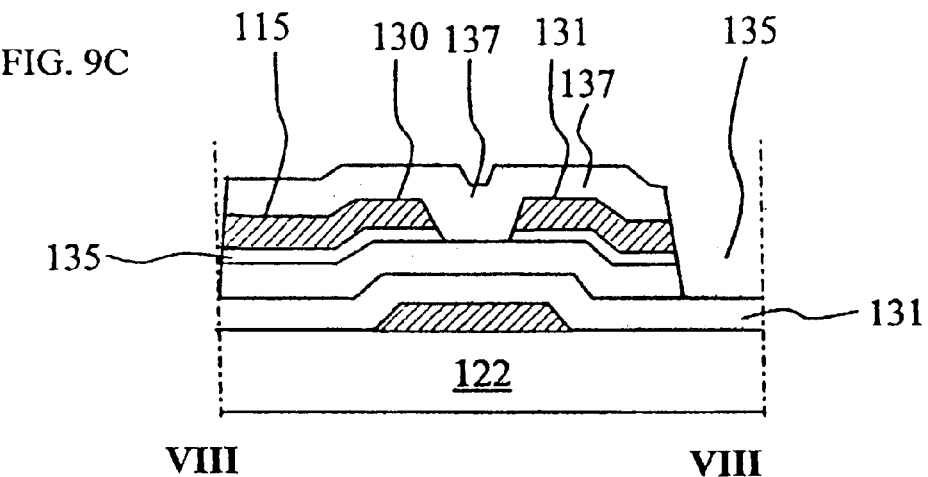

Now, referring to FIGS. 8C and 9C, the passivation layer 137, the patterned second metal layer 128, the ohmic contact layer 135 and the active layer 133 are simultaneously patterned using a third mask to form the data line 115, the data pad 119, the source electrode 130, the drain electrode 131 and the insulating segment 151. Accordingly, each pair of the gate line and the data line defines each pixel region "P" (in FIG. 6), and the gate insulation layer 131 remains in the pixel region. The insulating segment 151 is formed disposed over the first data shorting bar and at the intersections of the first data-shorting bar and the second connector 143 (see FIGS. 6 and 8D). As shown in FIG. 6, the insulating segment 151 is island-shaped as a result of the third mask process. Furthermore, the first shorting bar 129 and the second shorting bar 132 are separated by the first furrow 149 formed along a direction between the first shorting bar 129 and the second shorting bar 132. The first shorting bar 129 and the data pads 119 are separated by the second furrow 150 that is formed in a direction along the first shorting bar 129. Therefore, by forming the first furrow 149 and the second furrow 150 on both sides of the first data shorting bar 129, any electrical contact is prevented between the first shorting bar 129 and the second shorting bar 132 or even numbered data pads. The insulating segment 151, shown in FIG. 8C, comprises the patterned active layer 133, the ohmic contact layer 135, the island-shaped metal layer 128b, and the passivation layer 137.

Furthermore, in the third mask process, a first contact hole 139 is formed to extend through the data pad 119. A second contact hole 140 (in FIG. 6) is formed over the first data shorting bar 129 and a third contact hole 141 is formed over the second data shorting bar 132 due to the second hole (not show) and third hole 146 (in FIG. 8B).

As shown in FIG. 9C, a side portion of the drain electrode 131 is exposed during the patterning process described above, and a side portion of the data pad 119, as shown in FIG. 8C, is also exposed. Furthermore, although not depicted in the drawings, gate pad contact holes are formed disposed over the gate pads 118 (in FIG. 6) by patterning stacked layers over the gate pads. In the patterning process, a dry etching method may be used.

After the third mask process, the source electrode 130 and the drain electrode 131 are subsequently formed into designed shapes such that the TFT "T" (in FIG. 6) is complete, and the data line 115 and the data pad 119 are also formed into designed shapes.

Figure 9D:
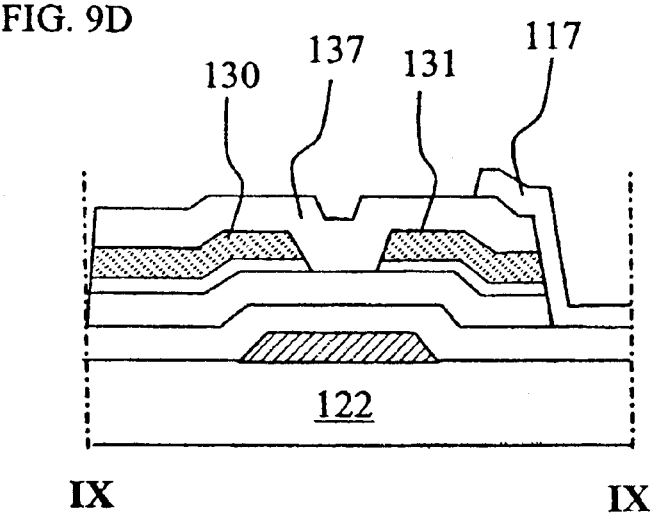

Now, referring to FIGS. 8D and 9D, a transparent conductive material including at least indium-tin-oxide (ITO) or indium-zinc-oxide (IZO) is deposited and patterned to form pixel electrode 117, first connector 142 (in FIG. 6) and second connector 143. Accordingly, the pixel electrode 117 contacts the side portion of the drain electrode 131 and is positioned in the pixel region "P" (in FIG. 6) and extends over the portion of the gate line 113, and thus becomes a part of the storage capacitor "C" (in FIG. 6). Moreover, the second connector 143 overlaps the insulating segment 151 and crosses the first data shorting bar 129 such that the second connector 143 electrically connects the data pad 119 to the second data shorting bar 132 via the first contact hole 139 and the third contacts hole 141. Therefore, the even numbered data line 115 is electrically connected with the second data shorting bar 132, and the second connector 143 contacts the side portion of the data pad 119. Furthermore, as shown in FIG. 6, the first connector 142 electrically connects the odd numbered lines of the data lines 115 to the first data shorting bar 129 via the first contact hole 139 and the second contact hole 140.

As previously described, since the insulating segment comprises several patterned layers and is formed between the first data shorting bar and the second connector at the intersection of the first shorting bar and the second connector, any short-circuit connection between the first data shorting bar and the second connector is prevented. Therefore, manufacturing yields of the LCD device are raised.

It will be apparent to those skilled in the art that various modifications and variations can be made in the capacitor and the manufacturing method thereof of the present invention without departing from the spirit or scope of the inventions. Thus, it is intended that the present invention cover the modifications and variations of this invention provided they come within the scope of the appended claims and their equivalents.

What is claimed is:

1. An array substrate for a liquid crystal display device, comprising:
a substrate;
a plurality of thin film transistors formed on the substrate, each thin film transistor comprises a gate electrode, a source electrode and a drain electrode;
a plurality of gate lines arranged in one direction on the substrate, each gate line connected with the gate electrodes of the plurality of thin film transistors and each gate line has a gate pad disposed at a first end thereof;
a plurality of data lines arranged perpendicular to the plurality of gate lines on the substrate, each data line connected to the source electrodes of the plurality of thin film transistors and each data line has a data pad disposed at a first end thereof;
a plurality of pixel electrodes located at pixel regions defined by intersections of the plurality of gate lines and the plurality of data lines, each pixel electrode contacting each drain electrode of the plurality of thin film transistors;
a first data shorting bar arranged parallel with the plurality of gate lines at the first end of the data lines;
a second data shorting bar arranged parallel with the plurality of gate lines at the first end of the data lines and spaced apart from the first data shorting bar;
a plurality of first connectors electrically connecting the odd numbered data lines to the first data-shorting bar;
a plurality of second connectors electrically connecting the even numbered data lines to the second data shorting bar; and
a plurality of patterned insulating segments formed over the first shorting bar and below the plurality of second connectors, wherein each patterned insulating segment includes at least a passivation layer, a metal layer, an ohmic contact layer, and an active layer and is disposed at an intersection between the first data shorting bar and each second connector.

2. The array substrate according to claim 1, wherein a side portion of each drain electrode of the plurality of thin film transistors is exposed to contact each pixel electrode.

3. The array substrate according to claim 1, wherein the first connectors, the second connectors, and the pixel electrodes are formed of at least one of indium-tin-oxide (ITO) and indium-zinc-oxide (IZO).

4. The array substrate according to claim 1, wherein the data lines and the data pads include at least a molybdenum (Mo) material.

5. The array substrate according to claim 1, wherein each of the first connectors and each of the second connectors contact the data pads through data pad contact holes.

6. An array substrate having thin film transistors, pixel electrodes, gate lines and data lines, wherein each thin film transistor is formed at a crossover point of each pairs of gate lines and data lines, and wherein each pixel electrode is formed in a pixel region defined by each of the pairs of gate lines and data lines, the array substrate comprising:
a plurality of data pads formed at a first end of the data lines and connected thereto, the data pads including odd numbered data pads and even numbered data pads, each data pad having a first contact hole;
a first shorting bar formed adjacent to the data pads and arranged perpendicular to the data lines;
a second shorting bar spaced apart from and arranged parallel with the first shorting bar;
a gate insulation layer covering the gate lines, the first shorting bar, and the second shorting bar, the gate insulation layer having second and third contact holes, wherein the second contact holes are formed over the first shoring bar, and wherein the third contact holes are formed over the second shorting bar;

a first connector connecting the odd numbered data pads to the first shorting bar through the first contact hole and second contact hole;

a plurality of second connectors each crossing the first shorting bar and connecting the even numbered data pads to the second shorting bar through the first contact hole and the third contact hole; and a plurality of island-shaped insulating segments formed between the first shorting bar and each second connector at each intersection of the first shorting bar and the second connector, each island-shaped insulating segment includes at least a passivation layer, a metal layer, a doped amorphous silicon layer, and a pure amorphous silicon layer and electrically insulates the first shorting bar from each second connector.

7. The array substrate according to claim 6, wherein the pixel electrodes, the first connector, and the second connectors are formed of one of indium-tin-oxide (ITO) and indium-zinc-oxide (IZO).

8. A liquid crystal display device, comprising:

a substrate;

a plurality of gate lines on the substrate;

a plurality of data lines on the substrate and disposed perpendicular to the plurality of gate lines;

a first data shorting bar arranged parallel with the plurality of gate lines at a first end of the data lines;

a second data shorting bar arranged parallel with the plurality of gate lines at a first end of the data lines and spaced apart from the first data shorting bar;

a plurality of first connectors electrically connecting odd numbered data lines to the first data-shorting bar;

a plurality of second connectors electrically connecting even numbered data lines to the second data shorting bar; and a plurality of patterned insulating segments formed over the first shorting bar and below the plurality of second connectors, wherein each patterned insulating segment includes at least a passivation layer, a metal layer, a doped amorphous silicon layer, and a pure amorphous silicon layer and is disposed at an intersection between the first data shorting bar and each second connector.

9. An array substrate for a liquid crystal display device, comprising:

a substrate;

a plurality of gate lines and data lines arranged on the substrate;

a first data shorting bar arranged parallel with the plurality of gate lines and connected to odd-numbered ones of the data lines;

a second data shorting bar arranged parallel with the plurality of gate lines and spaced apart from the first data shorting bar and connected to even-numbered ones of the data lines; and a plurality of patterned insulating layered segments formed over the first shorting bar, wherein each patterned insulating layered segment includes a metal layer.

10. The array substrate according to claim 9, wherein each of the patterned insulating layered segments includes a passivation layer, an ohmic contact layer, and an active layer.

11. The array substrates according to claim 9, wherein each of the patterned insulating layered segments includes a passivation layer, a doped amorphous silicon layer, and a pure amorphous silicon layer.

12. The array substrate according to claim 9, wherein the second data shorting bar is connected to each of the even-numbered ones of the data lines via connectors.

13. The array substrate according to claim 12, wherein each of the patterned insulating layered segments are disposed below the connectors.

* * * * *